United States Patent
Kawabata et al.

(10) Patent No.: US 7,326,742 B2
(45) Date of Patent: Feb. 5, 2008

(54) WET TYPE FRICTION MATERIAL

(75) Inventors: Masataka Kawabata, Toyota (JP); Atsushi Suzuki, Okazaki (JP); Hideki Tatewaki, Shizuoka-ken (JP); Katsumi Takezawa, Fukuroi (JP)

(73) Assignees: Toyota Jidosha Kabushiki Kaisha, Toyota-shi, Aichi-ken (JP); NSK-Warner K.K., Tokyo (JP)

( * ) Notice: Subject to any disclaimer, the term of this patent is extended or adjusted under 35 U.S.C. 154(b) by 206 days.

(21) Appl. No.: 10/685,438

(22) Filed: Oct. 16, 2003

(65) Prior Publication Data

US 2004/0121145 A1   Jun. 24, 2004

(30) Foreign Application Priority Data

Oct. 16, 2002   (JP) .............................. 2002-302007

(51) Int. Cl.
*C08K 3/36* (2006.01)
*C08K 5/14* (2006.01)

(52) U.S. Cl. .................. 524/31; 524/448; 524/493; 523/149; 523/152; 523/155; 523/156

(58) Field of Classification Search ................ 523/149, 523/152, 155, 156; 524/31, 448, 493
See application file for complete search history.

(56) References Cited

U.S. PATENT DOCUMENTS 5,563,196 A   10/1996  Kitahara et al. .............. 524/14
5,889,081 A * 3/1999  Kakegawa et al. .......... 523/156
6,060,549 A * 5/2000  Li et al. ...................... 524/445
6,586,373 B2  7/2003  Suzuki et al. ................ 508/101

FOREIGN PATENT DOCUMENTS

| EP | 1 203 897   | 5/2002  |
|----|-------------|---------|
| JP | 62-266238 A | 11/1987 |
| JP | 5-295233 A  | 11/1993 |
| JP | 7-18092 A   | 1/1995  |
| JP | 07-197016   | 8/1995  |
| JP | 7-197016 A  | 8/1995  |
| JP | 2001-27271 A| 1/2001  |
| JP | 2002-146041 A| 5/2002 |

* cited by examiner

*Primary Examiner*—Kriellion A Sanders
(74) *Attorney, Agent, or Firm*—Miles & Stockbridge P.C.

(57) ABSTRACT

The present invention provides a wet type friction material comprising a paper base material and binder, in which the paper base material includes silica having an average particle diameter of 1 to 10 μm and disc-shaped diatom earth, and the binder comprises a cured substance of liquid resin composition material obtained by mixing resol type phenol resin with silicone resin, where a weight ratio between non-volatile components of the resol type phenol resin and the silicone resin is adjusted to a range of 95/5 to 85/15.

4 Claims, 2 Drawing Sheets

WET TYPE FRICTION MATERIAL

BACKGROUND OF THE INVENTION

1. Field of the Invention

The present invention relates to a wet type friction material used in a friction engaging device such as a clutch and a brake employed within oil in an automatic transmission of a motor vehicle.

2. Related Background Art

A wet type friction material has been used in an automatic transmission of an automatic motor vehicle and the like. The automatic transmission of the automatic motor vehicle includes a multi-plate clutch in which a plurality of friction plates each formed by sticking wet type friction materials to surfaces of a metallic substrate (core plate) and a plurality of separator plates as friction counterpart materials each formed by a single plate such as a metallic plate are alternately arranged and is designed so that a driving force is transmitted by abutting these plates against each other or interrupting by releasing these plates from each other within ATF (automatic transmission fluid) used as a lubricating oil.

As a wet type friction material used in the oil in this way, a wet type friction material of paper type called as "paper friction material" is generally used. This wet type friction material is generally formed by paper-making fiber base materials such as natural pulp fibers, organic synthetic fibers or inorganic fibers with filler such as diatom earth or cashew resin and friction regulator in a wet manner and then by impregnating binder comprised of thermosetting resin and then by curing with heat. As the binder resin material, phenol resin having excellent heat-resistance, high mechanical strength and good compression fatigue property has conventionally been used mainly. Such a prior art is disclosed in Japanese Patent Application Laid-open No. 7-197016.

By the way, in a recent industrial field regarding automobiles, light weight and high efficiency of various parts have been sought in order to save energy and to achieve light weight. On the other hand, there is a tendency for seeking high rotation and high output of an automobile engine. Also in an automatic transmission, in order to cope with the compactness and light weight of the friction engaging device and the high rotation and high output of the automobile engine, regarding the wet type friction material, enhancement of coefficient of friction and further improvement in heat-resistance and endurance have been sought.

In order to resolve these problems, a technique for compounding high hard filler such as alumina to the paper base material has been investigated. However, in this technique, although coefficient of friction is great in an initial engaging condition, since an attacking force against the friction counterpart material is strong, as the usage of the friction material is advanced, the coefficient of friction is gradually decreased. Thus, this technique is not satisfactory. Further, in the past, resins other than phenol resin used as the binder, for example, silicone resin has also been investigated (for example, refer to Japanese Patent Application Laid-open No. 7-197016). The silicone resin has excellent heat-resistance and endurance based on siloxane bonding of main structure and does not generate a burned area called as "heat spot" on a friction counterpart material (separator plate) under a high temperature/high load condition and has excellent long term stability of coefficient of friction. However, since the silicone resin is soft, a compression fatigue property thereof is bad and a displacement amount of a total thickness of the friction material becomes great. Thus, a satisfactory friction material could not be obtained. Further, a μ–V (coefficient of dynamic friction–velocity) property may have negative gradient, with the result that, the friction material is used in a clutch, transmission shock may occur.

That is to say, regarding the wet type friction material, there is a need for seeking further improvement in three factors, i.e. high coefficient of friction, heat resistance and positive gradient of μ–V property.

SUMMARY OF THE INVENTION

Therefore, an object of the present invention is to provide a wet type friction material which has high coefficient of friction and excellent heat-resistance (anti-heat spot) and in which positive gradient of a μ–V property is enhanced.

The above object is achieved by the present invention relating to a wet type friction material comprising a paper base material and binder, in which silica having an average particle diameter of 1 to 10 μm and disc-shaped diatom earth are included in the paper base material and the binder is a cured substance of liquid resin composition material obtained by mixing resol type phenol resin and silicone resin, in which a weight ratio of non-volatile components between the resol type phenol resin and the silicone resin is adjusted within a range of 95/5 to 85/15.

Now, a wet type friction material according to the present invention will be fully explained. A paper base material used in the present invention is made into paper in a normal manner from slurry liquid obtained by dispersing, in water, fiber base materials including natural pulp fibers such as wood pulp, organic synthetic fibers such as aramid and inorganic fibers such as glass, and silica and disc-shaped diatom earth as fillers in a predetermined ratio.

Regarding the wet type friction material according to the present invention, by using the silica as the filler of the paper base material, coefficient of friction, particularly, μs (coefficient of static friction) can be enhanced.

The silica is preferable as the filler. The silica is silicon dioxide ($SiO_2$) and is relatively hard mineral naturally obtained as silica stone and quartz. Although the silica includes crystal silica obtained by pulverizing the original stone as it is and fused silica obtained by fusing the original stone at a high temperature greater than 1800° C. to vitrify the stone and by pulverizing the vitrified stone, either silica can be used, and, thus, the kind of silica is not limited. Regarding substance softer than the silica, for example, calcium carbonate, the effect for enhancing the coefficient of friction may not be enhanced, and, regarding substance harder than the silica, for example, alumina, although the coefficient of friction is high in an initial engagement condition, since an attacking force against the counterpart friction material is strong, the coefficient of friction may be reduced as such substance is being used. Thus, such substance is not preferable.

An average particle diameter of the silica is preferably 1 to 10 μm and more preferably 3 to 8 μm. If the average particle diameter is below the lower limit, since the particle diameter is too small to achieve the effect for enhancing the coefficient of friction; whereas, if the particle diameter exceeds the upper limit, the stable coefficient of friction may not be obtained.

A content of the silica is preferably 5 to 15 weight % of the entire paper base material. If the content is below the lower limit, the effect for enhancing the coefficient of friction may not be achieved; whereas, if the content exceeds the upper limit, the stable coefficient of friction may not be obtained.

Further, in the wet type friction material according to the present invention, by using the disc-shaped diatom earth as the filler of the paper base material, heat-resistance (anti-heat spot ability) and positive gradient of a μ–V property can be enhanced.

The diatom earth is earth obtained as a result that the dead body of plant plankton called as diatom has been fossilized for a long term. The diatom earth mainly includes silica and has many small pores and also has various shapes such as a spherical shape, a cylindrical shape, a disc shape and a ladder shape. Among them, the disc-shaped diatom earth is preferable. In the diatom earths other than the disc-shaped diatom earth, the effect for enhancing the heat-resistance (anti-heat spot ability) and positive gradient of a μ–V property may not be achieved.

An average diameter of the disc-shaped diatom earth is preferably 10 to 30 μm and more preferably 15 to 25 μm. If the average diameter is below the lower limit, the effect for enhancing the heat-resistance (anti-heat spot ability) and positive gradient of a μ–V property may not be achieved; whereas, if the average diameter exceeds the upper limit, the stable coefficient of friction may not be obtained.

An content of the disc-shaped diatom earth is preferably 25 to 45 weight % of the entire paper base material and more preferably 30 to 40 weight %. If the content is below the lower limit, the effect for enhancing the heat-resistance (anti-heat spot ability) and positive gradient of a μ–V property may not be achieved; whereas, if the content exceeds the upper limit, the stable coefficient of friction may not be obtained.

Incidentally, in the wet type friction material according to the present invention, other than the silica and the disc-shaped diatom earth as the filler and friction adjusting agent for the paper base material, calcium carbonate, magnesium carbonate, barium sulfate, talc and cashew resin can be used solely or in combination.

In the wet type friction material according to the present invention, by using a cured substance of liquid resin composition material of resol type phenol resin and silicone resin as binder, the heat-resistance (anti-heat spot ability) can be enhanced. The resol type phenol resin is obtained by reacting phenol class and aldehyde class under the presence of basic catalyst.

The phenol class may include, for example, phenol, cresol, xylenol, m-cresol, m-methyl phenol, resolsine, bisphenol A and the like, and the present invention is not limited to the specific phenol class. Further, such phenol class can be used solely or in combination.

The aldehyde class may include, for example, paraformaldehyde, formaldehyde, trioxane, acetaldehyde, benzaldehyde and the like, and the present invention is not limited to the specific aldehyde class. Further, such aldehyde class can be used solely or in combination.

Although a reaction mole ratio between the phenol class and the aldehyde class is not limited specially, such a mole ratio is preferably 0.8 to 1.6 and more preferably 0.9 to 1.5. If the reaction mole ratio is below the lower limit, non-reacted phenol monomer may be increased; whereas, if the reaction mole ratio exceeds the upper limit, since bridge density of the phenol resin becomes too high, the cured substance becomes harder, with the result that the heat-resistance (anti-heat spot ability) may be reduced.

The basic catalyst may include, for example, alkali class such as sodium hydroxide, potassium hydroxide, barium hydroxide and calcium hydroxide and amine class such as ammonia, triethyl amine, triethanol amine and the like. Further, such class may be used solely or in combination.

Although a weight average molecular weight of the phenol resin is not limited specially, such a molecular weight is preferably 130 to 650 and more preferably 150 to 500. If the weight average molecular weight of the phenol resin is below the lower limit, non-reacted phenol monomer may be increased and the hardness may be reduced. On the other hand, if the weight average molecular weight of the phenol resin exceeds the upper limit, viscosity of the resin may be increased to reduce compatibility with respect to the silicone resin.

The silicone resin is obtained by hydrolysis and condensation reaction of organochlorosilane as a raw material.

The organochlorosilane may be methyl trichlorosilane, ethyl trichlorosilane, phenyl trichlorosilane, dimethyl dichlorosilane, phenyl methyl dichlorosilane, trimethyl chlorosilane, and the present invention is not limited to the special organochlorosilane. Such organochlorosilane may be used solely or in combination.

Although a weight average molecular weight of the silicone resin is not limited specially, such a molecular weight is preferably 500 to 2000 and more preferably 600 to 1500. If the weight average molecular weight of the silicone resin is below the lower limit, the hardness may be reduced. On the other hand, if the weight average molecular weight of the silicone resin exceeds the upper limit, viscosity of the resin may be increased to reduce compatibility with respect to the phenol resin.

Regarding a mixing ratio between the resol type phenol resin and the silicone resin, it is preferable that a weight ratio of non-volatile components is adjusted to a range of 95/5 to 85/15. If the non-volatile component of the silicone resin is below 5 weight % of the total non-volatile component, the effect for enhancing the heat-resistance (anti-heat spot ability) may not be achieved; whereas, if such non-volatile component exceeds 15 weight %, the binder becomes too soft to increase the total thickness change, with the result that the endurance may be reduced.

As methods for impregnating the liquid resin composition material obtained by mixing the resol type phenol resin and the silicone resin with the paper base material, for example, there are a method for dipping the paper base material into the mixed resin composition material, a method for coating the liquid resin composition material by means of various coaters, a method for spraying the liquid resin composition material by means of a spray and the like. Among them, the method for dipping the paper base material into the liquid resin composition material is preferable. With this method, the impregnating ability of the resin for friction material with respect to the paper base material can be enhanced.

After the mixed resin composition material is impregnated into the paper base material, normally, the paper base material is dried, for example, at a temperature of 80 to 120° C. for 5 to 30 minutes and then is thermally cured at a temperature of 150 to 230° C. for 10 to 50 minutes.

Although a pore ratio of the friction material according to the present invention is not limited specially, such a pore ratio is preferably 20% to 70% and more preferably 30% to 60%. If the pore ratio is below the lower limit, a sucking and exhausting efficiency of ATF may be reduced to reduce the effect for enhancing the endurance; whereas, if the pore ratio exceeds the upper limit, the strength of the friction material may be reduced.

As mentioned above, according to the present invention, in order to achieve the high coefficient of friction and enhancement of the heat-resistance (anti-heat spot ability) and the positive gradient of the μ–V property requested in the wet type friction material, the silica having the particle diameter of 1 to 10 μm and the disc-shaped diatom earth are included in the paper base material as filler and the binder is formed by the cured substance of the liquid resin composition material obtained by mixing the resol type phenol resin and the silicone resin and the weight ratio between non-volatile components of the resol type phenol resin and of the silicone resin is selected to be fallen within a range of 95/5 to 85/15.

In the wet type friction material according to the present invention, since the silica and the disc-shaped diatom earth exist on the surface of the friction material, the coefficient of friction is increased and the heat-resistance (anti-heat spot ability) and the positive gradient of the μ–V property are enhanced. Further, by using the binder obtained by mixing the phenol resin having excellent compression fatigue property and the silicone resin having excellent heat-resistance at the predetermined ratio, the heat-resistance can be enhanced without reducing the endurance of the friction material.

DESCRIPTION OF THE PREFERRED EMBODIMENTS

Figure 1:
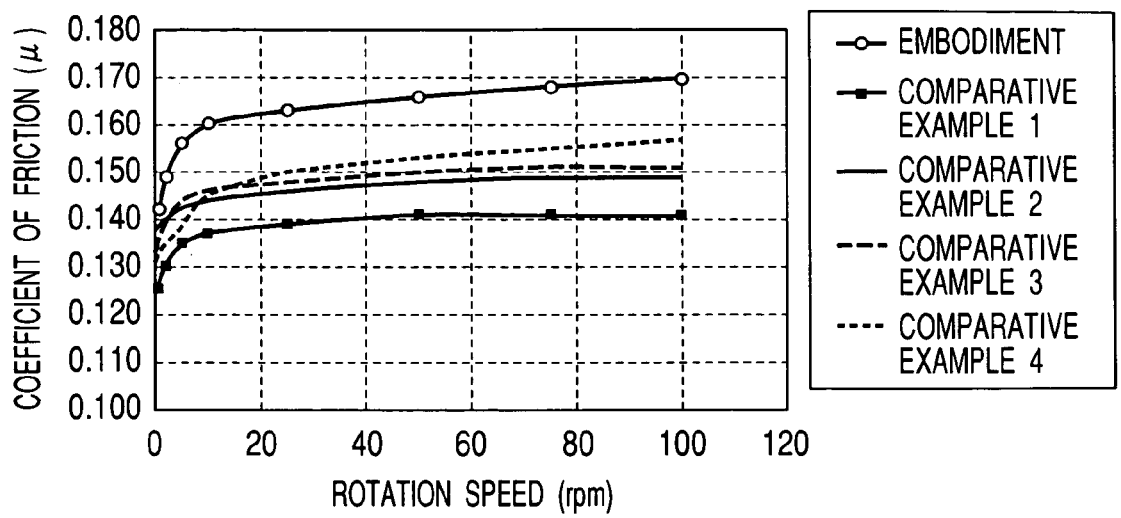
FIG. 1 is a graph showing μ–V properties of wet type friction materials of an embodiment and comparative examples 1 to 4 at an oil temperature of 40° C.

Now, an embodiment of the present invention and comparative examples 1 to 4 will be fully explained with reference to the accompanying drawings. Incidentally, it should be noted that the present invention is not limited to the embodiment. Further, the terms "part" and "%" in this specification all indicate "weight part" and "weight %", respectively.

(1) Manufacture of Paper Base Material

A mixture including natural pulp fibers of 35% and aramid fibers of 20% as fiber base components and silica of 10% (having average particle diameter of 5 μm) and disc-shaped diatom earth of 35% (average diameter of 25 μm) as fillers is dispersed in water to obtain slurry liquid, and a paper is made from such slurry liquid and is dried to manufacture a paper base material A used in the present invention. Further, as a paper base material generally used in the prior art, a paper base material B is manufactured by using natural pulp fibers of 35%, aramid fibers of 20% and particle-shaped diatom earth 45% (average particle diameter of 3 μm) as filler. Then, a paper base material C is manufactured by reducing the particle-shaped diatom earth as general filler to 35% (among the fiber base components of the paper base material B) and alternatively by adding silica of 10%. Further, a paper base material D is manufactured by using disc-shaped diatom earth of 45% in place of particle-shaped diatom earth of 45% among the fiber base components of the paper base material B (regarding a component ratio, refer to Table 1).

(2) Manufacture of Liquid Resin Component Material

Silicone resin (non-volatile component of 50%) of 100 parts is added to resol type phenol resin (non-volatile component of 50%) of 900 parts and these resins are mixed and agitated to obtain a liquid resin composition material used in the present invention.

Embodiment

The liquid resin composition material was diluted by methanol and the resulting liquid was impregnated into the paper base material A, and the impregnated paper base material was dried and then was cured by heating it at a temperature of 150° C. for 30 minutes. In this way, a wet type friction material having the paper base material A of 100 parts and the binder of 40 parts was obtained. Then, the friction material was punched to obtain a ring having an outer diameter of 130 mm and an inner diameter of 100 mm, and the ring was held in a mold heated to a temperature of 200° C. at pressure greater than 4.9 MPa for 30 seconds to integrate it to a ring-shaped core plate, thereby obtaining a friction plate having a diameter of 130 mm and a thickness of 2.3 mm.

COMPARATIVE EXAMPLE 1

The resol type phenol resin alone was used as the binder and the paper base material B was used. The other manufacturing processes were the same as those in the embodiment. In this way, a friction plate having a diameter of 130 mm and a thickness of 2.3 mm was obtained. The friction material is a conventional friction material and does not include silica, disc-shaped diatom earth and silicone resin.

COMPARATIVE EXAMPLE 2

The resol type phenol resin alone was used as the binder and the paper base material C was used. The other manufacturing processes were the same as those in the embodiment. In this way, a friction plate having a diameter of 130 mm and a thickness of 2.3 mm was obtained. On the basis of the conventional friction material, a part of filler was replaced by silica.

COMPARATIVE EXAMPLE 3

A cured substance of liquid resin composition material obtained by mixing the resol type phenol resin and the silicone resin was used as the binder and the paper base material B was used. The other manufacturing processes were the same as those in the embodiment. In this way, a friction plate having a diameter of 130 mm and a thickness of 2.3 mm was obtained. On the basis of the conventional friction material, the binder was replaced by mixture of phenol resin and silicone resin.

COMPARATIVE EXAMPLE 4

The resol type phenol resin alone was used as the binder and the paper base material D was used. The other manufacturing processes were the same as those in the embodiment. In this way, a friction plate having a diameter of 130 mm and a thickness of 2.3 mm was obtained. On the basis of the conventional friction material, the particle-shaped diatom earth of the filler was replaced by disc-shaped diatom earth.

The following evaluations were carried out regarding the friction plates obtained in the example and the comparative examples 1 to 4, by using a friction performance testing machine (SAE No. 2).

(1) μ-V Property

The μ-V property was evaluated under the following testing conditions. Results are shown in Graphs of FIGS. 1 and 2.

Testing Conditions

Revolution per minute: 0.72, 2, 5, 10, 25, 50, 75,
Surface pressure: 785 kPa
Number of friction faces: 6 faces
Oil amount: oil bath 700 ml
Oil temperature: 40° C. (FIG. 1), 100° C. (FIG. 2).

Figure 2:
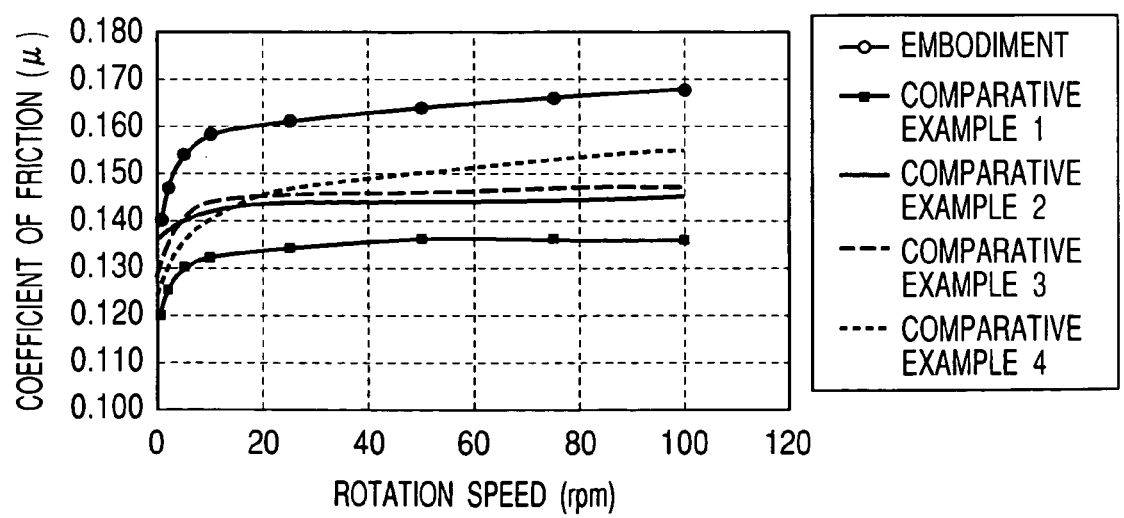
FIG. 2 is a graph showing μ–V properties of wet type friction materials of an embodiment and comparative examples 1 to 4 at an oil temperature of 100° C.

As can be seen from FIGS. 1 and 2, at both oil temperatures of 40° C. and 100° C., in comparison with the wet type friction materials of the comparative examples 1 to 4, the wet type friction material of the embodiment has higher coefficient of friction (μ) and the coefficient of friction is not so reduced under the high temperature and temperature dependency of the coefficient of friction is small. Further, positive gradient of μ-V property is improved; i.e. an increasing amount of the coefficient of friction is increased as a speed is increased.

(2) Heat-Resistance (Anti-Heat Spot Ability)

The heat-resistance was evaluated under the following testing conditions.

Testing Conditions

Revolution per minute: 8100 rpm
Surface pressure: 785 kPa
Inertia: 0.098 N m s
Number of friction faces: 6 faces
Oil amount: 180 ml/minute
Number of cycles: 1000

Figure 3:
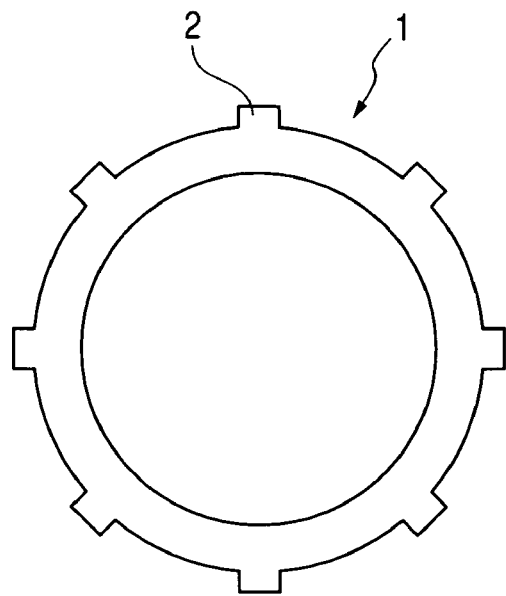
FIG. 3 is a front view showing a condition of a separator plate as a friction counterpart material when test are carried out by using the friction materials of the embodiment and the comparative examples 3 and. 4.

FIG. 3 shows a condition of an annular separator plate 1 as a friction counterpart material when the wet type friction materials of the embodiment and the comparative examples 3 and 4 are tested. The separator plate 1 is fitted to a spline (not shown) via pawl portions 2 and is positioned so that it can abut against a friction plate obtained by sticking the wet type friction material to a core plate. Further, FIG. 4 shows a condition of a separator plate 20 having pawl portions 12 and acting as a friction counterpart material when the friction materials of the comparative examples 1 and 2 are tested.

Figure 4:
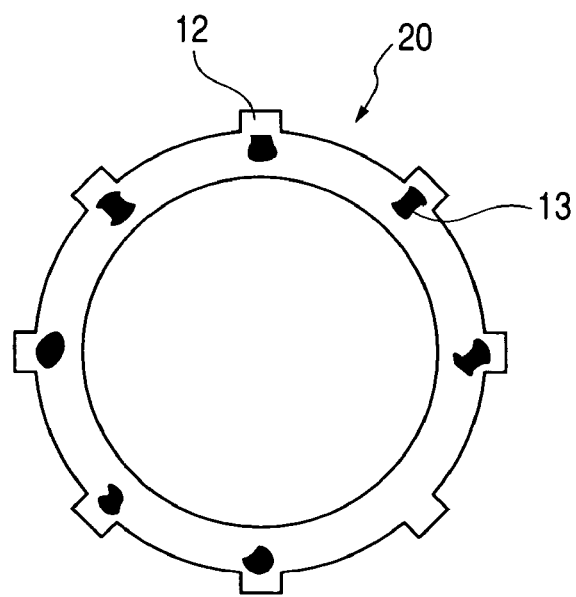
FIG. 4 is a front view showing a condition of a separator plate as a friction counterpart material when test are carried out by using the friction materials of the comparative examples 1 and 2.

Although a plurality of heat spots 13 (black areas caused by the burning or firing) were generated in FIG. 4, no heat spot was generated in FIG. 3. Namely, it can be seen that the effect for suppressing the heat spot can be achieved by using the friction materials of the embodiment and the comparative examples 3 and 4. That is to say, it is apparent that these friction materials have excellent heat-resistance. Incidentally, regarding the number of cycles, one cycle is constituted by one engagement and one release or disengagement. The Table 1 shows a relationship compositions of the friction materials of the friction materials of the embodiment and the comparative examples 1 to 4, and μ-V positive gradient, heat-resistance (anti-heat spot ability) and coefficient of friction.

TABLE 1

|  |  |  | embodiment | comperative example 1 | comperative example 2 | comperative example 3 | comperative example 4 |
|---|---|---|---|---|---|---|---|
| natural pulp fiber | | | 35 | 35 | 35 | 35 | 35 |
| aramid fiber | | | 20 | 20 | 20 | 20 | 20 |
| general diatom earth | | | — | 45 | 35 | 45 | — |
| disc-shaped diatom earth | | | 35 | — | — | — | 45 |
| silica | | | 10 | — | 10 | — | — |
| phenol resin | | | 36 | 40 | 40 | 36 | 40 |
| silicone resin | | | 4 | — | — | 4 | — |
| μ-V positive gradient | | | good | bad | bad | bad | good |
| heat-resistance (anti-heat spot ability) | | | good | heat spot generated | heat spot generated | good | good |
| coefficient of friction | μs (static) | 40° C. (0.7 rpm) | 0.142 | 0.125 | 0.138 | 0.134 | 0.128 |
| | | 100° C. (0.7 rpm) | 0.14 | 0.12 | 0.136 | 0.13 | 0.125 |
| | μ (dynamic) | 40° C. (100 rpm) | 0.170 | 0.141 | 0.149 | 0.151 | 0.157 |
| | | 100° C. (100 rpm) | 0.168 | 0.136 | 0.145 | 0.147 | 0.155 |

As mentioned above, while the embodiment and the comparative examples were fully examined, in the embodiment of the present invention the silica having the average particle diameter of 1 to 10 μm and the disc-shaped diatom earth are included within the paper base material and the cured substance of the liquid resin composition material obtained by mixing the resol type phenol resin and the silicone resin is used as the binder. That is to say, the present invention includes all of three elements, i.e. the silica as the filler, the disc-shaped diatom earth as the filler and the mixture composition material of the phenol resin and the silicone resin. To the contrary, in the comparative example 1, since the above-mentioned three elements are not included, and, in the comparative examples 2 to 4, although either of the above elements is includes, since all of the three elements are not included, from the Table 1, it is apparent that the effect same as the present invention cannot be achieved.

According to the wet type friction material of the present invention as mentioned above, the following effect can be obtained.

A wet type friction material having not only high coefficient of friction but also improved heat-resistance (anti-heat spot ability) and improved μ-V property can be provided. Accordingly, a wet type friction material which can cope with light-weight and compactness of the friction engaging device in the recent automatic transmissions and high rotation and high output of the automobile engine can be provided.

What is claimed is:

1. A wet type friction material comprising a paper base material and binder, wherein:
    said paper base material includes silica having an average particle diameter of 1 to 10 μm and disc-shaped diatom earth, an average diameter of the disc-shaped diatom earth being 10 to 30 μm;
    said binder comprises a cured substance of liquid resin composition material obtained by mixing resol type phenol resin with silicone resin having siloxane bonding, where a weight ratio between non-volatile components of the resol type phenol resin and the silicone resin is adjusted to a range of 95/5 to 85/15; and
    wherein a content of the disc-shaped diatom earth is 25 to 45 weight % of the entire paper base material.

2. A wet type friction material according to claim 1, wherein the average particle diameter of the silica is 3 to 8 μm.

3. A wet type friction material according to claim 1, wherein an average diameter of the disc-shaped diatom earth is 15 to 25 μm.

4. A wet type friction material according to claim 1, wherein a content of the disc-shaped diatom earth is 30 to 40 weight % of the entire paper base material.

* * * * *